(12) United States Patent
Baumann et al.

(10) Patent No.: US 8,594,894 B2
(45) Date of Patent: Nov. 26, 2013

(54) METHOD FOR PROTECTING A VEHICLE OCCUPANT IN A VEHICLE SEAT OF A VEHICLE

(75) Inventors: Karl-Heinz Baumann, Bondorf (DE); Michael Fehring, Neuhausen (DE); Till Heinrich, Stuttgart (DE); Marica Paurevic, Herrenberg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/376,799

(22) PCT Filed: May 27, 2010

(86) PCT No.: PCT/EP2010/003234
§ 371 (c)(1),
(2), (4) Date: Jan. 19, 2012

(87) PCT Pub. No.: WO2010/142381
PCT Pub. Date: Dec. 16, 2010

(65) Prior Publication Data
US 2012/0109468 A1  May 3, 2012

(30) Foreign Application Priority Data

Jun. 8, 2009 (DE) .......................... 10 2009 024 558

(51) Int. Cl.
| | |
|---|---|
| B60R 22/00 | (2006.01) |
| E05F 15/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC ................. 701/45; 280/730.2; 280/728.1

(58) Field of Classification Search
USPC .......................................................... 701/45
See application file for complete search history.

(56) References Cited

U.S. PATENT DOCUMENTS

| | | | |
|---|---|---|---|
| 6,037,731 A | 3/2000 | Fruehauf et al. | |
| 6,203,105 B1 * | 3/2001 | Rhodes, Jr. | ................ 297/284.6 |
| 6,336,656 B1 * | 1/2002 | Romeo | .......................... 280/733 |

(Continued)

FOREIGN PATENT DOCUMENTS

| | | |
|---|---|---|
| DE | 197 50 223 C2 | 6/1999 |
| DE | 10 2005 032 033 A1 | 8/2007 |

(Continued)

OTHER PUBLICATIONS

International Search Report with English translation dated Oct. 6, 2010 (six (6) pages).

(Continued)

*Primary Examiner* — Khoi Tran
*Assistant Examiner* — Rachid Bendidi
(74) *Attorney, Agent, or Firm* — Crowell & Moring LLP

(57) ABSTRACT

A method for protecting a vehicle occupant in a vehicle seat of a vehicle is provided. At least one protection element mounted on the vehicle seat and capable of being triggered to protect the vehicle occupant sitting on the vehicle seat is triggered when a collision is imminent or occurs. A reversible belt tensioner assigned to the vehicle seat is triggered at a time before a triggering of the protection element, and while or as the protection element is triggered, a resulting belt tensioning is released again.

8 Claims, 2 Drawing Sheets

(56) References Cited

U.S. PATENT DOCUMENTS

| | | | |
|---|---|---|---|
| 6,457,741 B2 * | 10/2002 | Seki et al. | 280/730.2 |
| 6,890,000 B2 * | 5/2005 | Taubenberger et al. | 280/733 |
| 7,093,898 B2 * | 8/2006 | Ladron De Guevara | 297/284.6 |
| 7,237,800 B2 * | 7/2007 | Itoga | 280/733 |
| 7,325,641 B2 * | 2/2008 | Bullinger et al. | 180/268 |
| 7,584,990 B2 * | 9/2009 | Suyama et al. | 280/733 |
| 7,677,598 B1 * | 3/2010 | Ryan et al. | 280/730.2 |
| 7,862,080 B2 * | 1/2011 | Hiroshige et al. | 280/733 |
| 7,987,031 B2 * | 7/2011 | Diebold et al. | 701/45 |
| 8,226,115 B2 * | 7/2012 | Sekizuka et al. | 280/733 |
| 2002/0008372 A1 * | 1/2002 | Bacher et al. | 280/735 |
| 2006/0061073 A1 * | 3/2006 | Naruse et al. | 280/730.2 |
| 2006/0108787 A1 * | 5/2006 | Czaykowska et al. | 280/806 |
| 2006/0196715 A1 * | 9/2006 | Fujishiro et al. | 180/271 |
| 2006/0267317 A1 * | 11/2006 | Ida et al. | 280/730.2 |
| 2007/0040364 A1 * | 2/2007 | Linder et al. | 280/730.2 |
| 2009/0096192 A1 * | 4/2009 | Marriott et al. | 280/728.1 |
| 2009/0210115 A1 * | 8/2009 | Gombert et al. | 701/45 |
| 2010/0090448 A1 * | 4/2010 | Pursche et al. | 280/730.2 |

FOREIGN PATENT DOCUMENTS

| | | |
|---|---|---|
| DE | 10 2006 006 807 A1 | 8/2007 |
| EP | 1 160 134 A1 | 12/2001 |
| EP | 1 698 521 A1 | 9/2006 |
| WO | WO 2004/005080 A2 | 1/2004 |
| WO | WO 2007093459 A1 * | 8/2007 |
| WO | WO 2008/110610 A1 | 9/2008 |

OTHER PUBLICATIONS

Form PCT/ISA/237 (five (5) pages).

* cited by examiner

METHOD FOR PROTECTING A VEHICLE OCCUPANT IN A VEHICLE SEAT OF A VEHICLE

BACKGROUND AND SUMMARY OF THE INVENTION

The invention relates to a method for protecting a vehicle occupant in a vehicle seat of a vehicle, wherein at least one protection element mounted on the vehicle seat and capable of being triggered to protect the vehicle occupant sitting on the vehicle seat is triggered when a collision is imminent or occurs.

German Patent Document DE 10 2005 032 033 A1 describes a restraint system for vehicle occupants, comprising a vehicle seat, the back rest of which is laterally bounded by at least one side wall, wherein the transition from a front side of the back rest to the side wall forms a support surface for a vehicle occupant, and further comprising a air bag module, the air bag of which is accommodated in a folded state in the back rest of the vehicle seat and the unfolding direction of which is oriented towards the support surface.

German Patent Document DE 197 502 23 C2 describes a method for the driving situation- and driving style-related adaptation of the lateral support of a person sitting in the seat of a vehicle, in particular a passenger car, wherein a transverse acceleration acting on the seat is determined as a reference value for the adaptation, and the determined transverse acceleration is weighted by the current travelling speed of the vehicle and a control variable for the amount of the adaptation is derived therefrom.

International Patent Document WO 2008 110 610 A1 describes a vehicle seat arrangement for a motor vehicle and a method for protecting a vehicle occupant, comprising a vehicle seat, at least one inflatable element mounted on the vehicle seat for the protection of a vehicle occupant sitting on the seat, means for inflating the inflatable element, which inflate the inflatable element in response to a control signal indicating a collision of the motor vehicle or an imminent collision of the motor vehicle with an object, wherein the inflatable element is designed and arranged such that, while it is being inflated in response to the control signal, it applies a pulse to the vehicle occupant which moves the vehicle occupant away from a collision section of the motor vehicle which collides or will collide with the object.

European Patent Document EP 1 698 521 A1 describes a device and a method for protecting a vehicle occupant in a vehicle.

Exemplary embodiments of the present invention are directed to a method for the control of a vehicle occupant restraint system which is improved in comparison to prior art.

In the method according to the invention for protecting a vehicle occupant in a vehicle seat of a vehicle, in particular a passenger car, at least one protection element mounted on the vehicle seat and capable of being triggered to protect the vehicle occupant sitting on the vehicle seat is triggered when a collision is imminent or occurs. According to the invention, a reversible belt tensioner assigned to the vehicle seat is triggered at a time before a triggering of the protection element, and while or as the protection element is triggered, a resulting belt tensioning is released again.

The method according to the invention ensures that the vehicle occupant is moved into a position suitable for the triggering of the protection element, e.g., an inflatable or movable protection element such as a lateral cushion or support, and held there for a short time, and that, by releasing the belt tensioning, for example by deactivating a retractor, he/she becomes once again movable in good time, so that, by triggering the protection element, a motion impulse or an impetus can be applied to the vehicle occupant, whereby an increase of the distance between the vehicle occupant and a collision section of the motor vehicle which collides or will collide with the object is achieved.

As a result of an early application of the motion impulse to the vehicle occupant, who has been brought by the preceding belt tensioning into a position suitable for the absorption of the motion impulse or impetus, e.g., into a customary upright seated position, and who is seated freely movable owing to the retractor being, for example, deactivated while or as the motion impulse or impetus is triggered by the protection element, an acceleration acts on the vehicle occupant before the occurrence of a collision, whereby a subsequently acting crash energy at a collision, i.e., the absolute value of the crash energy and thus a stress and/or acceleration maximum of the vehicle occupant, is reduced.

In a conventional vehicle seat, the vehicle occupants would be accelerated with a time delay owing to the elastic properties of the vehicle seat and/or a distance from the vehicle seat, for example by a forward displacement of the vehicle occupant as a result of braking in case of a collision hazard. This delayed acceleration results in further stress and/or acceleration maxima of the vehicle occupant. This is securely avoided by the present invention, thereby reducing occupant stress.

In a particularly advantageous embodiment, the belt tensioner is triggered at a time before a triggering of the protection element, e.g., an inflation of an inflatable element or a movement of a movable element. As a result, the vehicle occupant, or at least a section of the body of the vehicle occupant, is moved towards the back rest of the vehicle seat and held there. This avoids the delayed acceleration resulting from the forward displacement of the vehicle occupant.

In a particularly advantageous way, the inflatable element or the movable element applies, while being inflated or moved in response to the control signal, an impulse, in particular a motion impulse or impetus, to the vehicle occupant or at least a section of the body of the vehicle occupant, whereby the vehicle occupant or at least a section of the body of the vehicle occupant is moved away from the collision section of the motor vehicle which collides or will collide with the object. This increases a distance between an estimated collision point and the vehicle occupant. By combining a pre-triggering of the belt tensioner and a subsequent triggering of the protection element while the retractor is deactivated, in particular in an event-related manner, it is ensured that the vehicle occupant can absorb the motion impulse. In other words, as a result of the deactivation of the retractor and the resulting release of the belt tensioning as or while the protection element is triggered, the motion impulse or impetus applied by the triggered protection element can be absorbed by the vehicle occupant without being inhibited by the retractor.

The vehicle occupant is moved towards the interior of the vehicle and thus away from the deforming lateral region of the vehicle, for example the door lining or the B post, by the inflated or moving element.

The motion impulse or impetus applied to the vehicle occupant by the inflated or moving element expediently meets the vehicle occupant in the rear position after being moved by the belt tensioner towards the back rest of the vehicle. As a result, the whole surface of the inflatable element can act on the vehicle occupant or at least on a body section of the vehicle occupant. The movable side wall can therefore optimally act on the vehicle occupant or at least on a body section.

The restraint of the vehicle occupant therefore begins much earlier than with a conventional restraint system. In addition, the vehicle occupant participates as early as possible in an acceleration by the triggering of the protection element, in order to avoid acceleration peaks.

No substantial relative speed is built up between the inflatable element and the vehicle occupant. As a result, the relative speed between the vehicle occupant and the lateral region of the vehicle always remains lower than in a conventional protective device with an occupant restraint system.

In a particularly advantageous embodiment, the invention allows an inflation of the inflatable element or a movement of the movable element and thus a moving away of the vehicle occupant from the collision point in particular in response to a so-called pre-crash signal, before the vehicle actually collides with the object. By the inflating or moving element, the vehicle occupant is moved out of his/her seated position away from the collision section of the vehicle, i.e., the collision point, generating an additional distance between the vehicle occupant and the collision point. This additional distance represents an additional absorption distance, whereby the effects of the collision on the vehicle occupant are reduced. In addition, as the vehicle occupant moves away, the relative speed between him/her and the vehicle structure intruding into the vehicle interior owing to the collision can be reduced. In this process, the distance travelled by the vehicle occupant away from the collision point towards the vehicle interior can be used as an additional deformation distance in the event of a collision.

Embodiments of the invention are explained in greater detail below with reference to drawings.

BRIEF DESCRIPTION OF THE DRAWING FIGURES

Of the drawings.

Corresponding parts are identified by the same reference numbers in all figures.

DETAILED DESCRIPTION

Figure 1:
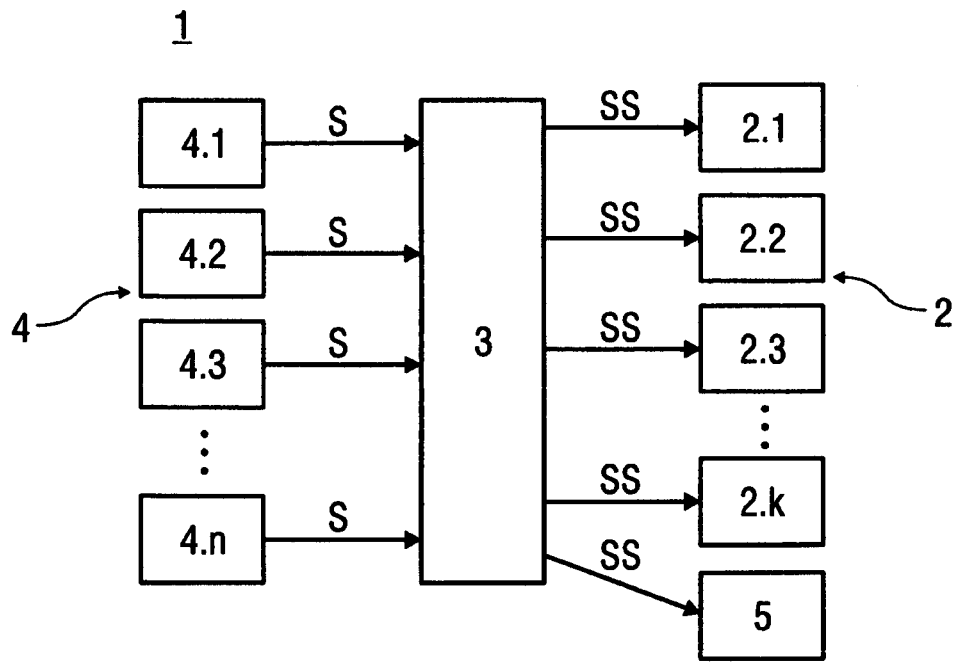
FIG. 1 shows a device for protecting a vehicle occupant in a vehicle seat.

FIG. 1 shows a device 1 for protecting a vehicle occupant. The device 1 comprises various protection elements 2.1 to 2.$k$, which may, for example, serve as a lateral support and/or alleviate an impact by inflating air cushions. The device 1 comprises a control unit 3, which may, for example, be a part of a control unit provided in the vehicle. The protection elements 2.1 to 2.$k$ are assigned to at least one vehicle seat not shown in detail in the drawing.

The protection elements 2.1 to 2.$k$ are mounted on the vehicle seat and can be triggered for the protection of a vehicle occupant sitting on the vehicle seat. The protection elements 2.1 to 2.$k$ may for example be an inflatable element integrated into a side of a back rest or into a seat side rest, such as a side cushion (also known as side airbag or air cushion), and/or an element which is movably mounted on the vehicle seat, such as a movable seat side rest. In the following description, the protection element 2.1 will be referred to as inflatable element 2.1 and the protection element 2.2 will be referred to as movable element 2.2.

The side cushions are conventional airbags or air cushions. Only the actuator has to have a specific control characteristic to hold the internal pressure in the airbag at a preset level and therefore offer protection against intruding parts as long as possible.

Each vehicle seat may comprise two inflatable elements 2.1, in particular opposite each other, and two movable elements 2.2, in particular opposite each other. The elements 2.1 and 2.2 in particular provide a lateral support for the vehicle occupant in the vehicle seat. Inflatable elements 2.1 may also be integrated into an adjoining vehicle door and/or the side rest.

In addition, the device 1 comprises a belt tensioner 5. The belt tensioner 5 is a conventional protection device which, when activated, holds the upper body of the vehicle occupant by mechanical tensioning as close as possible to the back rest, thereby restraining the vehicle occupant. In this process, the vehicle occupant is moved by the triggered belt tensioner 5 from a forward position towards the back rest and securely held there.

The inflatable element 2.1, the movable element 2.2 and/or the belt tensioner 5 is/are are usually triggered at an imminent or actual collision. For timely triggering of the elements 2.1 and 2.2, signals S can be fed to the control unit 3 from sensors 4.1 to 4.$n$ and/or from other control units. The control unit 3 may, for example, receive signals from at least one environment detection unit, at least one acceleration sensor, travelling speed or rotational speed sensor and/or data signals such as a pre-crash signal from another control unit. The control unit 3 comprises processing modules not shown in detail, which process the received signals S into a pre-crash signal and, resulting therefrom, into control signals SS for actuating at least one of the elements 2.1 to 2.2 and/or the belt tensioner 5. As an alternative or in addition, the received pre-crash signal can be processed into control signals SS by means of the control unit 3.

The invention provides that, by means of controlling the control unit 3 during the operation of the vehicle, the actuation of at least one inflatable or movable element 2.1 and 2.2 is combined with that of the belt tensioner 5 in such a way that the belt tensioner is triggered at a time before a triggering one of the protection elements 2.1 to 2.2, and while or as the respective protection element 2.1 or 2.2 is triggered, the retractor is deactivated, so that the belt tensioning can be and is released.

For this purpose, the belt tensioner 5 and the respective element 2.1 and/or 2.2 are actuated and/or triggered in response to a control signal SS signaling a collision or an imminent collision of the vehicle with an object. By means of the control system implemented in the control unit 3, it is ensured that the belt tensioner 5 is triggered before a triggering of the element(s) 2.1 to 2.2.

In this context, the invention is based on the concept that, for example at a lateral impact, the vehicle occupant is accelerated with a time delay, because the vehicle occupant will be seated at a distance from a back rest or seat cushion or has to overcome a slack, for example a softness of the seat foam or a hunched position. In order to let the vehicle occupant participate in an acceleration as soon as possible, thereby reducing the acceleration loads acting on the vehicle occupant in a collision, an acceleration or motion impulse/impetus is applied to the vehicle occupant by means of the inflatable or movable element 2.1 to 2.2, for example an inflatable cushion in the side rest, in the vehicle door and/or in a seat side wall, before the collision, e.g., a lateral impact, and therefore as soon as possible. In other words: the vehicle occupant is pre-accelerated.

In order to obtain an optimal pre-acceleration, i.e., a suitable impetus acting on the vehicle occupant by the inflation or movement of the respective element 2.1 to 2.2, the belt tensioner 5 is triggered before the inflatable or movable element 2.1 to 2.2. The vehicle occupant is thereby moved and pulled into the vehicle seat and adopts an optimum position in which his/her upper body is as close as possible to the seat side wall, in particular to the outer seat side wall adjacent to the vehicle door. The movement of the vehicle occupant towards the back rest of the vehicle seat is expediently completed with the start of the triggering of the respective inflatable or movable element 2.1 to 2.2.

The impetus resulting from the triggering of the inflatable or movable element 2.1 to 2.2 and the subsequent lateral movement of the vehicle occupant is preferably initiated before the occurrence of the collision. The pre-impetus acting on the vehicle occupant as a result of the triggering of the inflatable or movable element 2.1 to 2.2 is greater the more firmly the vehicle occupant bears against the outer seat side wall. In addition, the preceding belt tensioning can be released by deactivating the retractor during or shortly after the triggering of the inflatable or movable element 2.1 to 2.2 and thus the desired impetus acting on the vehicle occupant, in order to provide some freedom of movement, i.e., the necessary escape space for the vehicle occupant away from the collision point.

Such a combination of a time-offset triggering of the belt tensioner 5 and the movable/inflatable element(s) 2.1 to 2.2 and a release of the belt tensioning at the triggering of the movable/inflatable element 2.1 to 2.2, ensures that the vehicle occupant, by adopting a suitable sitting position and by a resulting optimum impetus, is pre-accelerated in the impact direction to be expected, so that his/her distance from the vehicle side adjacent to the impact is increased and the speed differential to intruding vehicle parts is reduced. As soon as the impulse of the collision impact dominates, the distance already covered can be used as an additional deformation distance. This mitigates the collision impact on the vehicle occupant. In addition, the application of the motion impulse/impetus can reduce stresses in the pelvic region via the seat well.

Figure 2:
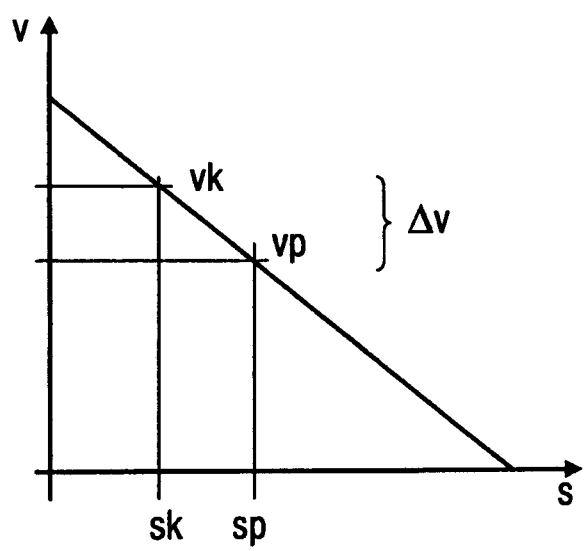
FIG. 2 is a velocity-distance diagram.
Figure 3:
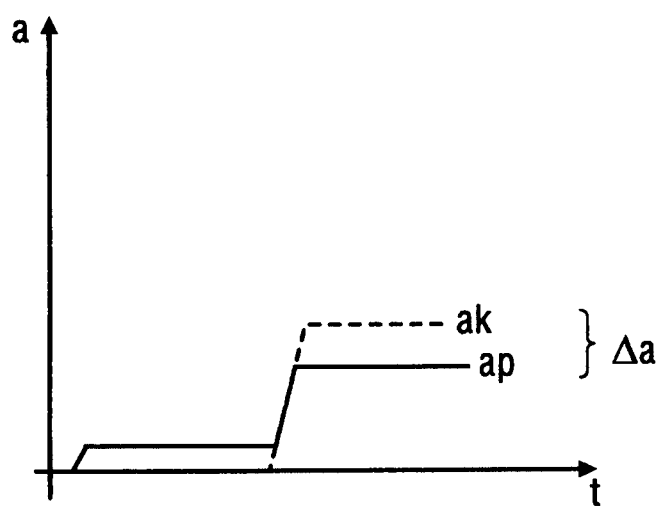
FIG. 3 is an acceleration-time diagram.

FIGS. 2 and 3 are two diagrams which illustrate the reduction of $\Delta v$, $\Delta a$ of the acceleration a acting on the vehicle occupant across the time t and of the contact velocity v across the distance s as a result of the combination of early belt tensioning and subsequent occupant impetus by the triggering of one or more of the movable or inflatable elements 2.1 to 2.2. In a conventional method for the protection of the vehicle occupant without any preceding belt tensioning, the contact velocity value vk between the vehicle occupant and the intruding vehicle parts is higher at a shorter covered distance sk. In contrast to this, in the present method for the protection of the vehicle occupant, there is a lower contact velocity value vp between the vehicle occupant and the intruding vehicle parts at a longer covered distance sp. The lower contact velocity value vp results from the pre-acceleration of the vehicle occupant and the reduced relative speed between the vehicle occupant and the intruding vehicle parts resulting therefrom. The longer covered distance sp results from the distance covered between the vehicle occupant and the intruding vehicle parts during the pre-acceleration of the vehicle occupant. By pre-accelerating the vehicle occupant, the contact velocity value vp is reduced significantly compared to the contact velocity value vk by the value $\Delta v$.

The acceleration values ak acting on the vehicle occupant in a conventional method for the protection of the vehicle occupant without any preceding belt tensioning are higher than the acceleration values ap in the method for the protection of the vehicle occupant with belt tensioning and subsequent occupant impetus accompanied by a release of the belt. In the present method for the protection of the vehicle occupant, there is a predictive pre-acceleration of the vehicle occupant before a collision of the vehicle. This pre-acceleration significantly reduces, by the value $\Delta a$, the acceleration value ap compared to the acceleration value ak.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for protecting a vehicle occupant in a vehicle seat of a vehicle, the method comprising:
    triggering at least one protection element mounted on the vehicle seat when a collision is imminent or occurs, the at least one protection element protects the vehicle occupant sitting on the vehicle seat;
    triggering a reversible belt tensioner assigned to the vehicle seat at a time before the triggering of the protection element; and
    releasing the reversible belt tensioner while or as the at least one protection element is triggered, wherein the release of the reversible belt tensioner is initiated while or as the at least one protection element is triggered.

2. The method according to claim 1, wherein the reversible belt tensioner and the protective element are actuated or triggered in response to a control signal signaling a collision or an imminent collision of the vehicle with an object or a specified braking of the vehicle.

3. The method according to claim 1, wherein the reversible belt tensioner applies an impulse to the vehicle occupant or at least to a body section of the vehicle occupant, the impulse causing the vehicle occupant or at least to the body section of the vehicle occupant to move towards a back rest of the vehicle seat or to be held at the back rest.

4. The method according to claim 3, wherein the movement or holding of the vehicle occupant towards or at the back rest of the vehicle seat is completed with an initiation of the triggering of the protective element.

5. The method according claim 2, wherein as the protective element is triggered, an impulse is applied to the vehicle occupant or at least to a body section of the vehicle occupant so that the vehicle occupant or at least to a body section of the vehicle occupant is moved away from a collision section of the vehicle, which collision section collides or will collide with the object.

6. The method according to claim 5, wherein the moving away of the vehicle occupant by the triggered protection element starts before the occurrence of the collision.

7. The method according to claim 2, wherein the at least one protection element comprises two inflatable elements arranged opposite each other in side walls of the vehicle seat, wherein only the inflatable element facing a prospective collision point is triggered in response to the control signal and is inflated towards the vehicle occupant.

8. The method according to claim 2, wherein the at least one protection element comprises two movable side rests arranged opposite each other on the vehicle seat, wherein only the side rest facing the prospective collision point is triggered in response to the control signal and is moved towards the vehicle occupant.

* * * * *